UNITED STATES PATENT OFFICE.

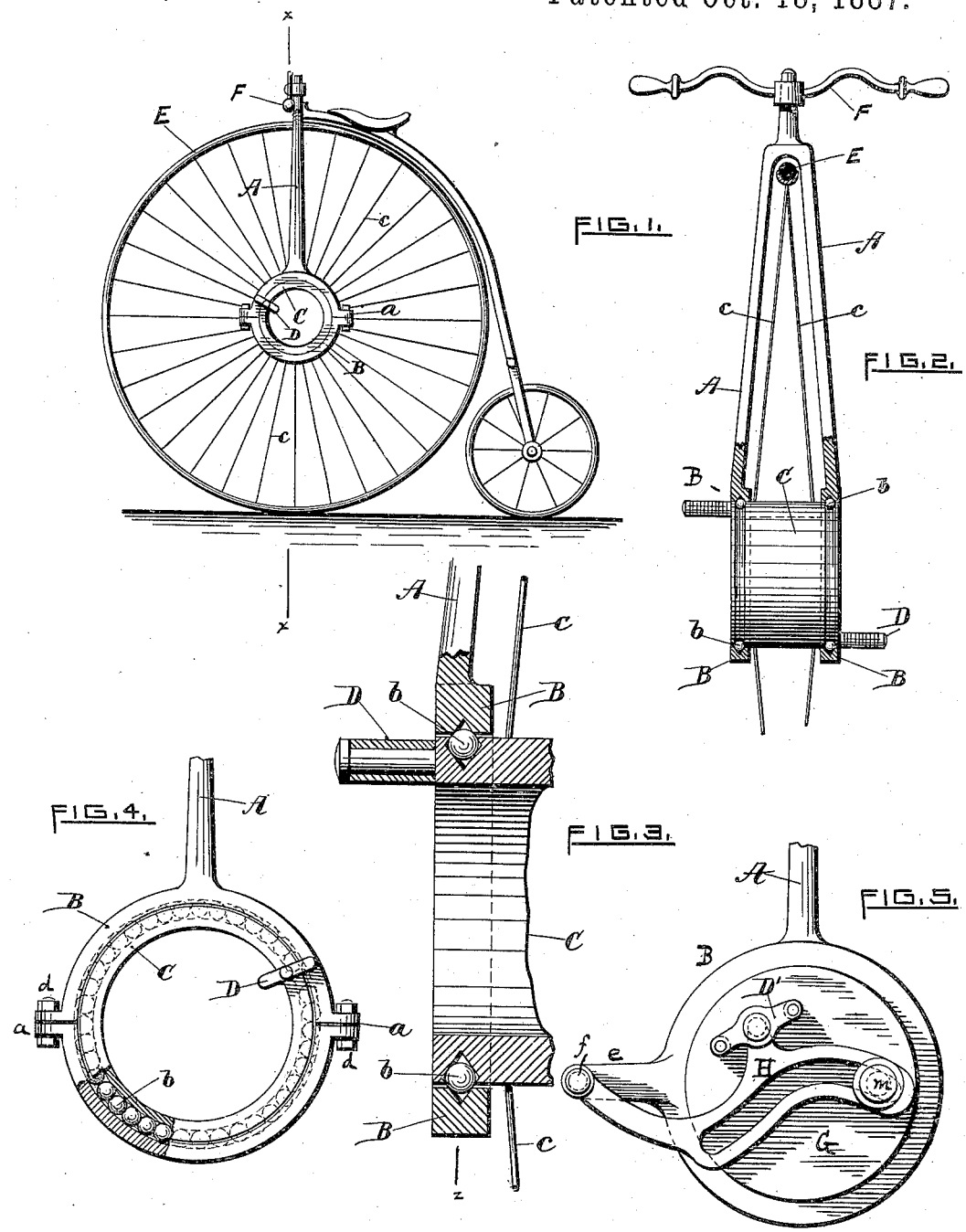

THOMAS W. FEELEY, OF PROVIDENCE, RHODE ISLAND, ASSIGNOR OF TWO-THIRDS, BY DIRECT AND MESNE ASSIGNMENTS, TO WARREN R. PERCE AND JOHN J. KEEGAN, OF SAME PLACE.

BICYCLE.

SPECIFICATION forming part of Letters Patent No. 371,747, dated October 18, 1887.

Application filed May 13, 1887. Serial No. 238,145. (No model.)

*To all whom it may concern:*

Be it known that I, THOMAS W. FEELEY, of the city and county of Providence, in the State of Rhode Island, have invented a certain new and useful Improvement in Bicycles; and I declare the following to be a specification thereof, reference being had to the accompanying drawings.

Like letters indicate like parts.

Figure 1 is a side elevation of my improved bicycle. Fig. 2 shows the same partly in front elevation and partly in vertical section on line $x\ x$ of Fig. 1. Fig. 3 is a vertical diametrical section of the tubular hub and rings, showing the interior arrangement of the ball-bearings. Fig. 4 is a side elevation of said hub and ring, with a portion shown in vertical section on line $z$ of Fig. 3 to show the ball-bearings. Fig. 5 shows in side elevation the treadle and its mode of operation.

My invention relates to bicycles; and it consists of a tubular hub having flanged circumferential grooves on each side for the reception of ball-bearings and mounted within rings or sleeves upon each side, which rings or sleeves have an interior channel for said balls and are made each in two half-sections, the upper of which is integral with the standard, and the lower of which is connected with the upper by ears and screws, as hereinafter fully specified.

Fig. 1 shows a bicycle of my improved construction. It has the usual front and hind wheels and the usual perch, standard, head, handle, and saddle. The forks or standards A have integral therewith, at their base, on each side, respectively, a ring or sleeve, B, made in two semicircular sections, and which have ears $a$, by which said sections are united adjustably by screws and nuts $d$. The hub C is tubular, and is not mounted on a shaft or axle, as in other bicycles, but within said rings B. On the periphery of said hub C, on each side, is a flanged groove, in which all around (as seen in Fig. 4) are placed balls $b$ for bearings, which lie in juxtaposition within said groove. The shape of the groove or channel is seen in Fig. 3 in cross-section. The opening between the flanges of said groove is somewhat less in width than the diameter of the balls $b$. The balls $b$ are inserted in said groove by an opening of sufficient width in any part of said flange to allow the balls to enter, and said opening is afterward closed, so as to be uniform in width with the flange. The consequence is that the whole series of balls $b$ are thus arranged in said peripheral grooves of the hub C, as shown in the drawings. They cannot leave said groove, because confined therein by said flanges, yet they slightly project therefrom, as seen in Fig. 3, and are free to rotate in position. The inner surfaces of the rings B have a corresponding V-shaped channel to receive the projecting portion of the balls $b$, as appears in Figs. 3 and 4. The spokes $c$ are inserted in the hub C, as shown in Figs. 2 and 3.

Instead of the usual crank for the pedals, I insert the pedals D into the side rim of the hub C.

As the upper section of the ring B is integral with the standard A, it furnishes a firm body for attachment. In Fig. 5 I show a stem, $e$, projecting from said ring, (and which is practically only an extension of one of the ear-pieces $a$,) and a treadle, H, affixed thereto by the bolt or screw $f$. This treadle has a foot-rest, D', and a curved slot within which a crank-pin, $m$, is held, which crank-pin enters the edge of the hub C like the pedal D. By the curve of the slot the crank-pin is, when pressed by the foot, carried beyond the line of the dead-center, and so the treadle is made useful in propelling the vehicle.

As the treadle H is detachable, my bicycle may be interchangeably used either with the treadle, as described, or with the pedal D, (or its equivalent, the crank-pin $m$,) as may be preferred.

When the treadle attachment is used for the propulsion of the bicycle, the saddle (which may be adjustable as in bicycles in common use) should be adjusted farther back upon the perch, and the liability of suffering a "header" or a headlong fall from the machine, which is the common danger in riding upon such vehicles, is greatly reduced, and at the same time the power will be more effectively applied to such treadle as its fulcrum $f$ is toward the rear of the machine.

It is obvious that the same method of ball-bearings and mounting of wheels is applicable to tricycles and other vehicles.

I claim as a novel and useful invention and desire to secure by Letters Patent—

1. In a wheeled vehicle, a hub having a cylindrical surface and provided with circumferential grooves, which are flanged on each side, in combination with a series of balls placed in said grooves and retained therein by said flanges, so that only a segmental portion of said balls can project outwardly therefrom between said flanges, and standard forks with rings wherein said hub is mounted, and which have on their inner surface annular channels to receive said segmental portions of the balls, substantially as specified.

2. In a foot-propelled vehicle, a tubular hub having pedals, in combination with standard forks having rings in which said hub is mounted, substantially as described.

3. In a wheel for foot-propelled vehicles, a tubular hub mounted as described, in combination with covers G, to close the ends thereof, substantially as and for the purpose specified.

4. The combination of the standard A, the hub C, having the crank-pins $m$, the rings B, having the stem $e$, and the treadle H, having the foot-rest D' and pivotally mounted upon said stem, substantially as described.

5. In a bicycle, the combination of the standards A, a rotatable hub, C, suitably mounted and having crank-pins $m$, and treadles H, having foot-rests D' and engaging with said crank-pins $m$, which treadles are pivoted to a suitable fixed support of the bicycle, substantially as specified.

THOMAS W. FEELEY.

Witnesses:
WILLIAM L. QUIMBY,
DANIEL W. FINK.